(12) United States Patent
Tabuchi et al.

(10) Patent No.: US 8,312,257 B2
(45) Date of Patent: Nov. 13, 2012

(54) SYSTEM AND METHOD FOR PERFORMING HARDWARE RESOURCE ASSIGNMENT IN A LARGE-SCALED SYSTEM

(75) Inventors: Yoji Tabuchi, Tokyo (JP); Kayo Kuroyama, Tokyo (JP)

(73) Assignee: NEC Corporation, Tokyo (JP)

( * ) Notice: Subject to any disclaimer, the term of this patent is extended or adjusted under 35 U.S.C. 154(b) by 365 days.

(21) Appl. No.: 12/726,469

(22) Filed: Mar. 18, 2010

(65) Prior Publication Data

US 2010/0241840 A1 Sep. 23, 2010

(30) Foreign Application Priority Data

Mar. 18, 2009 (JP) ................................. 2009-067002

(51) Int. Cl.
*G06F 9/00* (2006.01)
*G06F 9/24* (2006.01)
*G06F 1/24* (2006.01)

(52) U.S. Cl. ................................. 713/2; 713/1; 713/100

(58) Field of Classification Search ........................ 713/2
See application file for complete search history.

(56) References Cited

U.S. PATENT DOCUMENTS

| 7,080,244 B2 * | 7/2006 | Natu et al. ......................... 713/1 |
| 7,334,120 B2 * | 2/2008 | Rothman et al. .................. 713/2 |
| 7,500,094 B2 * | 3/2009 | Phelps et al. ...................... 713/2 |
| 7,974,416 B2 * | 7/2011 | Zimmer et al. ............... 380/281 |

FOREIGN PATENT DOCUMENTS

| EP | 2182444 A1 * | 5/2010 |
| JP | 10-293684 A | 11/1998 |
| JP | 2001-229117 A | 8/2001 |
| JP | 2004070946 A | 3/2004 |
| JP | 2004265043 A | 9/2004 |
| JP | 2008071042 A | 3/2008 |
| JP | 2008-191957 A | 8/2008 |
| WO | 2009028007 A | 3/2009 |

OTHER PUBLICATIONS

Japanese Office Action for JP2009-067002 issued Oct. 20, 2010.

* cited by examiner

*Primary Examiner* — Suresh Suryawanshi

(57) ABSTRACT

A resource assignment system includes a driver on an option ROM mounted on a PCI device, to perform hardware resources assignment under a Pre-Boot environment; and an OS driver to perform the hardware resource assignment under an OS environment. A BIOS includes a resource management table showing a range of an I/O space to be assigned to a bridge device in a layer higher than that of the PCI device which requests the I/O space; and an ACPI table used to notify a hardware configuration and data to use an extended I/O space to the OS. The resource management table includes a Pre-Boot table in which assignment of a first granularity to a Legacy-I/O space for a Pre-Boot environment is defined; and an OS table in which assignment of a second granularity to the extended I/O space for an OS environment is defined.

8 Claims, 3 Drawing Sheets

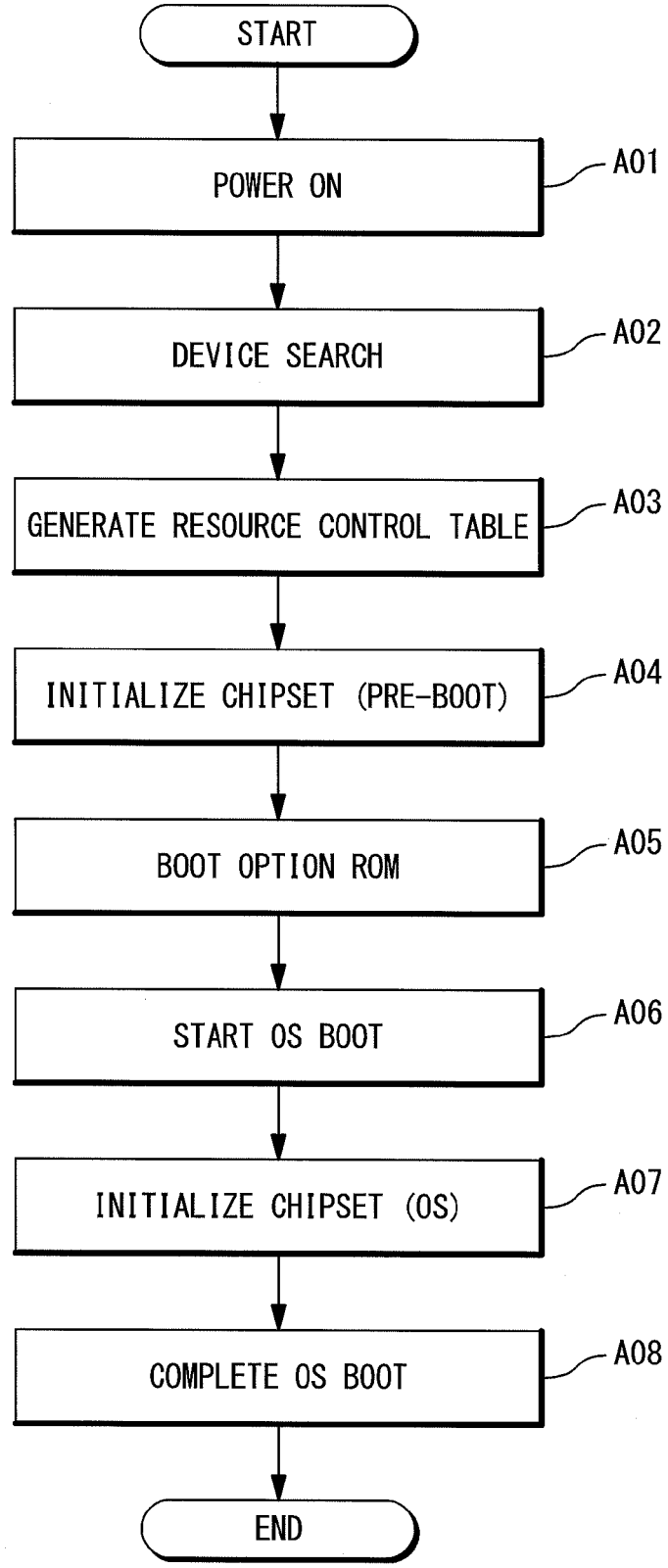

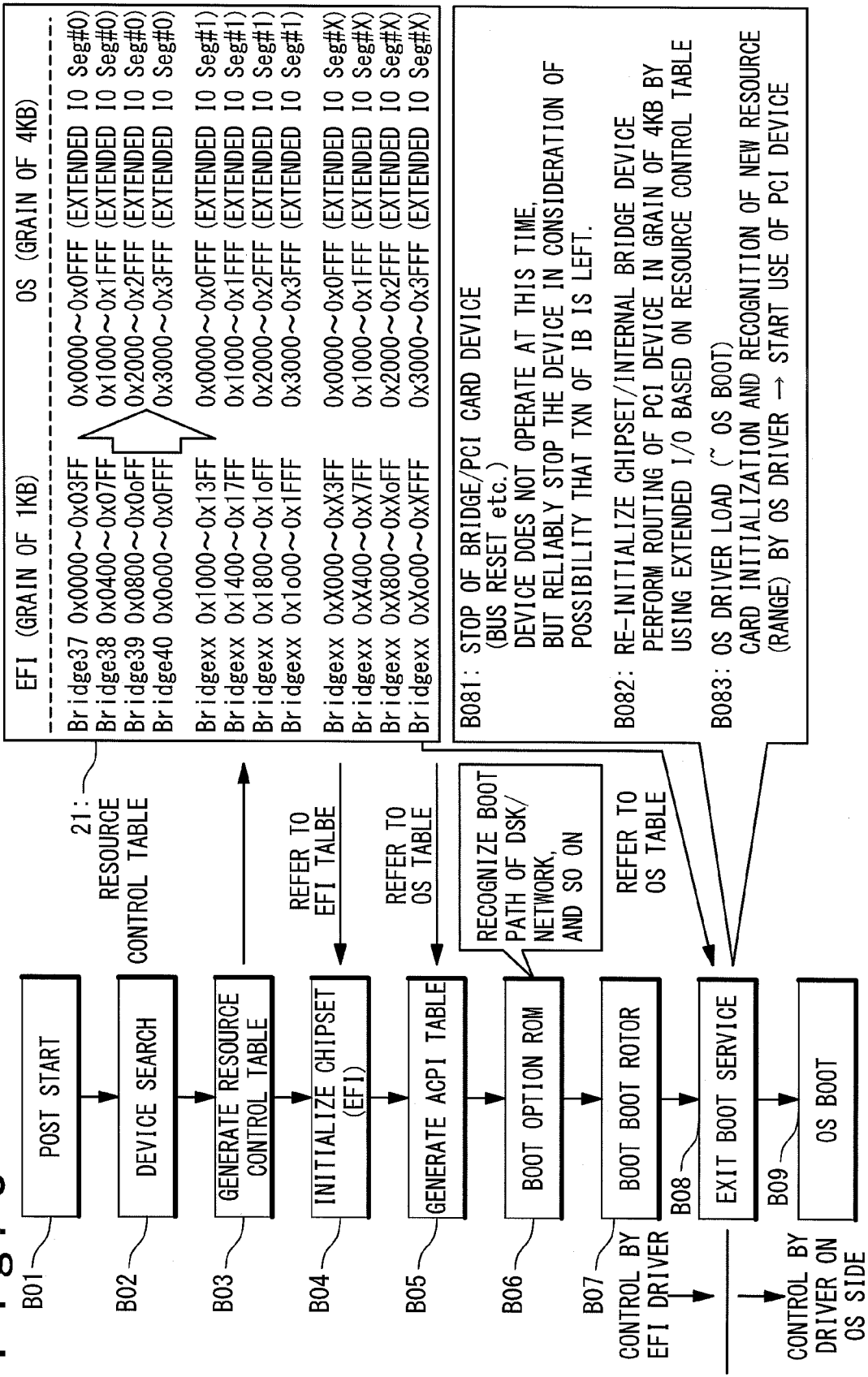

SYSTEM AND METHOD FOR PERFORMING HARDWARE RESOURCE ASSIGNMENT IN A LARGE-SCALED SYSTEM

INCORPORATION BY REFERENCE

This application claims a priority on convention based on Japanese Patent Application No. 2009-067002. This disclosure thereof is incorporated herein by reference.

TECHNICAL FIELD

The present invention relates to a resource assignment system, and more specifically to a resource assignment system that performs hardware resource assignment in a large-scaled system.

BACKGROUND ART

When a large number of PCI (Peripheral Components Interconnect) cards are to be loaded in a large-scaled system, a lack of system resources is worried. Especially, a Legacy-IO (Input/Output) space is limited to 64 KB (Kilo Bytes). Because the IO space of 4 KB per bridge device (slot) is basically assigned, 16 slots at a maximum can be only assigned to the IO space.

There are two measures against this situation. A first measure is to assign the IO space in units of 1-KB granularities. Here, the granularity is a "process segmentation unit" in segmenting a process into sub processes and assigning the sub processes to a plurality of processors for processing a large amount of numerical data in a large-scaled multiprocessor system. The 1-KB granularity shows that a granularity unit is 1 KB. More specifically, a chipset has a function to permit IO space assignment in units of 1-KB granularities, and this function is utilized. Since this method goes beyond the PCI standard specification, there is no problem when a bridge device is not made conscious directly as in Pre-Boot environment but it is necessary to hide the bridge device for an OS (Operating System). However, in a device of a PCI-Express generation in place of a PCI card, a root port of the PCI-Express which is equivalent to a bridge device is directly controlled by the OS to allow a PCI-Express function to be effectively used. For this reason, it means inhibition of the PCI-Express function to hide the bridge device to the OS supporting the PCI-Express.

A second measure is a method of using an "extended IO space" in which an IO space of 64 KB or more can be assigned. A method of accessing to a function of the extended IO space is defined in ACPI standard specification (Advanced Configuration and Power Interface Specification) and this function is under the presumption that the OS uses the space. Therefore, in order for BIOS (Basic Input/Output System) to use this function under the Pre-Boot environment, it is necessary to add a new function to the BIOS, which different from a BIOS standard specification.

Under the above circumstances, a new IO space resource assignment method for realizing a large-scaled IO system is demanded.

In conjunction with the above description, the following conventional examples are known.

Japanese Patent Publication (JP 2001-229117A; patent literature 1) discloses a computer and an extended unit control method. In the conventional technique, when connection between a PC and a docking station is detected and BIOS (SMI handler) is started, IO space assignment to a gate array connected to an ISA bus is disabled. Moreover, the I/O space is specified in an I/O window of a PCI-PCI bridge of the docking station. Further, the I/O space is assigned to a command block register of a PCI IDE (integrated Drive Electronics) controller. Then, processes such as initialization of a device mounted in the docking station, programming of a data transfer speed, release of a password, and so on are executed by transmitting an ATA command to the register, the IO space assignment is released, and completion of connection with the docking station is notified to an OS.

Japanese Patent Publication (JP 2008-191957A; patent Document 2) discloses a computer system and a file system automatic setting OS starting method. In this conventional technique, after initialization of the system is completed upon start of processing, whether or not an SCSI (Small Computer System Interface) card is mounted is determined based on a vendor ID and device ID of the SCSI card. If the SCSI card is mounted, whether or not there is setting of an Option ROM (extended ROM) as an effective start program for booting OS is determined. At time of OS booting for the first time, because there is no setting of the effective Option ROM, an automatic Option ROM setting validating process is started. In the automatic Option ROM setting validating process, a DISK connected to a SCSI card needs to be searched, and therefore, a first SCSI card slot is detected and an SCSI card slot number is detected and held. The Option ROM is temporarily validated for the detected slot, and an FS (file system) in the DISK under the SCSI card mounted in the detected SCSI card slot is read out. Then, whether the FS is an OS bootable file system is determined, and if the file system can be started by the OS, data indicating that the setting of the Option ROM is valid is stored into a RAM. Subsequently, whether the detected slot number is coincident with a final slot number is determined. If the slot number is not final, an SCSI slot number obtained by counting up the target slot number by "1" is held as a next target slot number. If the slot number is final, whether or not the setting of the Option ROM on the RAM has been changed is determined, and if it has been changed, the initialization of the apparatus is performed since the device requires reactivation.

Japanese Patent Publication (JP-A-Heisei 10-293684; Patent Document 3) discloses a computer system and a start-up control method. In this conventional example, a system BIOS of a BIOS-ROM system including a POST (Power-On-Self-Test) routine and a driver routine for extension is set to a protect mode, and a CPU address space after "100000h" which can be accessed only in the protect mode is assigned to this system BIOS, and an address space "F0000h to FFFFFh" which can be accessed in a real mode is assigned to the system BIOS including a BIOS driver group.

It should be noted that POST is a test to be automatically executed for each device such as a computer upon power supply, to check whether or not hardware has any default.

CITATION LIST

1. Patent Literature

Patent Literature 1: JP 2001-229117A
Patent Literature 2: JP 2008-191957A
Patent Literature 3] JP-A-Heisei 10-293684

SUMMARY OF THE INVENTION

In an aspect of the present invention, a resource assignment system includes a driver on an option ROM mounted on a PCI (Peripheral Components Interconnect) device, arranged on a memory by a BIOS (Basic Input/Output System), and configured to perform hardware resources assignment under a Pre-Boot environment; and an OS (operating System) driver arranged on the memory by said BIOS, and configured to perform the hardware resource assignment under an OS environment.

In another aspect of the present invention, a resource assignment method is achieved by performing hardware resource assignment under Pre-Boot environment by a driver on an option ROM mounted on a PCI (Peripheral Components Interconnect) device, and arranged on a memory by BIOS (Basic Input/Output System); and by performing the hardware resource assignment under OS environment by an OS (operating System) driver arranged on the memory by said BIOS.

A function of extended IO space can be provided to an OS in a computer system even when a driver on an Option ROM (extended ROM) does not support the extended IO space.

BRIEF DESCRIPTION OF THE DRAWINGS

The above and other objects, advantages and features of the present invention will be more apparent from the following description of certain embodiments taken in conjunction with the accompanying drawings, in which:

FIG. 2 is a flow chart showing operation of the resource assignment system of the present invention; and FIG. 3 is a flow chart showing operation in an embodiment.

DESCRIPTION OF EMBODIMENTS

Figure 1:
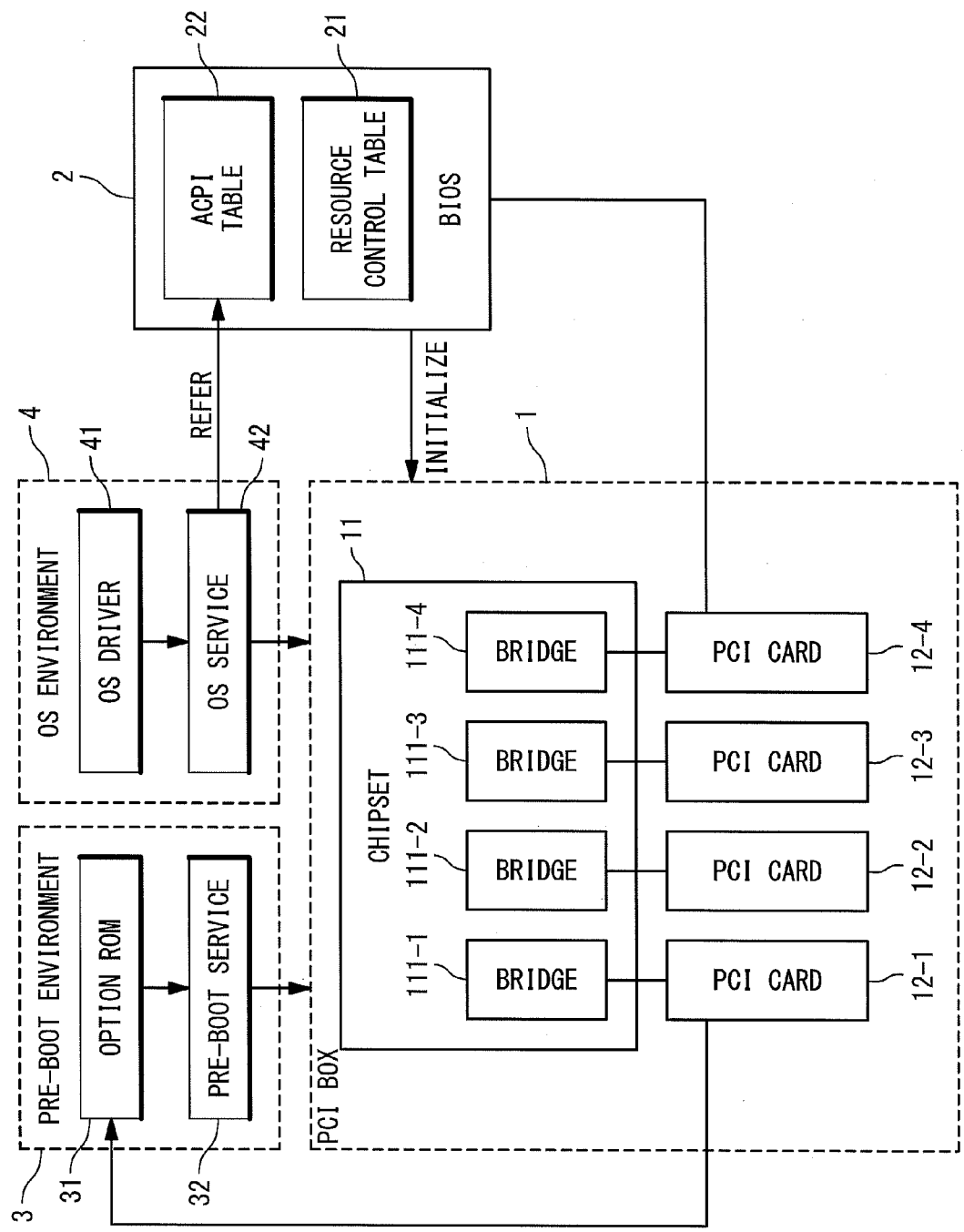
FIG. 1 is a conceptual diagram showing a configuration example of a resource assignment system of the present invention.

Hereinafter, a resource assignment system of the present invention will be described in detail with reference to the attached drawings.

As shown in FIG. 1, the resource assignment system according to an embodiment of the present invention includes a PCI (Peripheral Components Interconnect) BOX 1, a BIOS (Basic Input/Output System) 2, Pre-Boot environment 3, and OS environment 4.

The PCI BOX 1 is a box which exists on a platform represented as hardware and which includes a chipset and PCI cards. The number of PCI BOXes 1 is increased or decreased depending on a system configuration, and a case where only one PCI BOX 1 exists will be described in this example, for simplification. However, it should be noted that the number of PCI BOXes 1 may be plural. The PCI BOX 1 includes a chipset 11 and PCI cards 12 (12-$i$ where i=1 to n, where n is the number of cards). The chipset 11 is an LSI group in the hardware. The chipset 11 supports a 4-KB mode and a 1-KB mode as an assigning system of an IO space to bridge devices, and switches the 4-KB mode and the 1-KB mode by setting a PCI configuration space.

The chipset 11 includes bridges 111 (111-$i$, where i=1 to n). The bridges 111 are bridge devices internally provided in the chipset 11.

The PCI cards 12 (12-$i$, where i=1 to n) are mounted with option ROMs (extended ROMs). The PCI cards 12 are a kind of PCI devices. Cards such as a network card, a graphic card, and a sound card are considered as examples of the PCI card 12. It should be noted that the PCI card 12 is not limited to these examples.

The BIOS 2 is firmware for controlling the above platform. In practice, the BIOS 2 includes a combination of this firmware, a memory for this firmware, and a processor realizing this firmware based on the firmware. A CPU (Central Processing Unit), a microprocessor, a semiconductor integrated circuit (IC) having a same function and so on are considered as examples of the processor. It should be noted that the processor is not limited to these examples. The BIOS 2 initializes the chipset 11 and the PCI cards 12 (12-$i$ where i=1 to n). Moreover, the BIOS 2 controls the PCI cards under the Pre-Boot environment by booting the option ROM in each of the PCI cards 12 (12-$i$ where i=1 to n). The BIOS 2 includes a resource management table 21 and an ACPI (Advanced Configuration and Power Interface) table 22. The resource management table 21 indicates a range of an IO space to be assigned to the bridge 111 (111-$i$ where i=1 to n) on the upper layer side than that of the PCI card 12 (12-$i$ where i=1 to n) which requests the IO space. The ACPI table 22 is a standard function of making the OS to recognize the hardware configuration of the PCI BOX 1, and notifies a data necessary to use the extended IO space to the OS.

The Pre-Boot environment 3 and the OS environment 4 are realized by software defining respective operations of the Pre-Boot environment 3 and the OS environment 4, a memory storing this software, and a processor executing this software.

The Pre-Boot environment 3 includes an option ROM 31 and a Pre-Boot service 32. The option ROM 31 controls the PCI cards 12 (12-$i$ where i=1 to n) through the Pre-Boot service 32. Here, the option ROM 31 indicates a driver on the option ROM mounted on the PCI card 12 (12-$i$ where i=1 to n). The option ROM 31 is arranged or developed onto a memory by the BIOS 2. The Pre-Boot service 32 provides the option ROM 31 with a service for access to the hardware configuration.

The OS environment 4 includes an OS driver 41 and an OS service 42. The OS driver 41 is a driver under OS environment and controls the PCI cards 12 (12-$i$ where i=1 to n) through the OS service 42. The OS service 42 has a function of converting into the extended IO space, and performs control of the extended IO space based on the data obtained from the ACPI table 22.

Referring to FIG. 2, an operation of this embodiment will be described.

(1) Step A01: "Start-Up"

The BIOS 2 starts a POST (Power-On-Self-Test) upon start-up of the platform in the hardware.

(2) Step A02: "Device Search"

The BIOS 2 performs device search to search the PCI cards 12 (12-$i$ where i=1 to n) in the PCI BOX 1.

(3) Step A03: "Production of Resource Management Table"

When any of the PCI cards 12 (12-$i$ where i=1 to n) requests the IO space, the BIOS 2 determines a range of the JO space to be assigned to the bridge 111 (111-$i$ where i=1 to n) on the upper layer side than that of the PCI card 12 (12-$i$ where i=1 to n), and stores the determined range in the resource management table 21.

(4) Step A04: "Chipset Initialization for Pre-Boot Environment"

The Pre-Boot environment 3 is assumed to be EFI (Extensible Firmware Interface) environment. The BIOS 2 carries out initialization of the chipset 11 and the bridges 111 (111-$i$ where i=1 to n) provided in the chipset 11 based on the resource management table 21 in accordance with assignment of 1-KB granularity of a Legacy IO space to the EFI environment (Pre-Boot environment 3).

(5) Step A05: "Boot Option ROM"

The BIOS 2 boots the option ROM 31 on one of the PCI cards 12 (12-$i$ where i=1 to n) operable under the Pre-Boot environment. Thus, a process starts under the Pre-Boot environment 3. By booting the option ROM 31, the BIOS 2 can control the PCI card 12 (12-*i* where i=1 to n) and can recognize a boot path such as SCSI and NIC.

(6) Step A06: "Start OS Boot"

The option ROM 31 boots a boot loader through the boot path under the Pre-Boot environment, to start OS boot.

(7) Step A07: "Chipset Initialization for OS Environment"

Immediately before the OS boot after the process ends under the Pre-Boot environment 3, the BIOS 2 carries out initialization of the chipset 11 and the bridge devices provided in the chipset 11 based on the resource management table 21 in accordance with assignment of 4-KB granularity of the extended IO space for the OS environment 2. Then, the BIOS 2 ends the process under the Pre-Boot environment 3 and stops the option ROM 31.

(8) Step A08: "OS Boot Completion"

The BIOS 2 shifts a control from the driver on the side of the option ROM 31 to a driver (OS driver 41) on the OS side. The OS driver 41 carries out re-initialization of the PCI cards 12 (12-*i* where i=1 to n). Thus, the OS boot is completed and a process starts under the OS environment 4.

As described above, by resetting the IO space at time of a change from the Pre-Boot environment to the OS environment, it is possible to perform optimum resource assignment.

Next, referring to a flowchart shown in FIG. 3, an operation of this embodiment of the present invention will be described in detail.

(1) Step B01: "POST Start"

First, the BIOS 2 starts POST after power supply to the platform in hardware is turned on.

(2) Step B02: "Device Search"

The BIOS 2 carries out the device search and recognizes the bridges 111 (111-*i* where i=1 to n) in the chipset 11 and the PCI cards 12 (12-*i* where i=1 to n) mounted in a lower layer.

(3) Step B03: "Generation of Resource Management Table"

The BIOS 2 determines a range of the IO space to be assigned to the recognized bridges 111 (111-*i* where i=1 to n) and PCI cards 12 (12-*i* where i=1 to n), and stores the determined range in the resource management table 21. At this time, as the resource management table 21, the BIOS 2 generates two types of assignment tables: an assignment table (EFI table) in the 1-KB granularity using only the Legacy IO space for the EFI environment; and an assignment table (OS table) of the 4-KB granularity using the extended IO space for the OS environment.

(4) Step 04: "Chipset Initialization for EFI Environment"

Next, the BIOS 2 carries out a process of switching a mode for the IO space assignment to the chipset 11 to the 1 KB mode, assigns the Legacy IO space to any of the bridges 111 (111-*i* where i=1 to n) and the PCI cards 12 (12-*i* where i=1 to n) based on the resource management table 21 for the EFI environment (EFI table), and carries out an initialization process.

(5) Step B05: "Generation of ACPI Table"

Next, the BIOS 2 generates the ACPI table 22 based on the resource management table 21. A range of the IO space assigned to each bridge and an address translation system in the extended IO space is defined in this ACPI table 22 based on the resource management table 21 for the OS environment (OS table).

(6) Step B06: "Boot Option ROM"

Then, the BIOS 2 boots the option ROM 31 of each of the PCI cards 12 (12-*i* where i=1 to n) and develops it on a memory. That is, the BIOS 2 loads the option ROM 31 that controls each of the PCI cards 12 (12-*i* where i=1 to n). As a result, the option ROM 31 recognizes a DISK (a file system) under a storage-group device such as an SCSI card. Here, the option ROM 31 functions as an EFI driver.

(7) Step B07: "Boot Boot Loader"

The option ROM 31 boots the OS by booting the boot loader.

(8) Step B08: "Exit Boot Service"

Then, after developing the data necessary for the OS boot from the DISK onto the memory once, the option ROM 31 calls an "Exit Boot Service" under the Pre-Boot environment, refers to the resource management table 21 for the OS environment in this service, and sets the 4-KB granularity of the extended IO space to the bridges 111 (111-*i* where i=1 to n) and the PCI cards 12 (12-*i* where i=1 to n).

(9) Step B09: "OS Boot"

After completion of the "Exit Boot Service", the OS loads the driver so as to shift the control of the PCI cards 12 (12-*i* where i=1 to n) completely to the OS side, and then completes the OS boot. That is, the OS driver 41 is loaded onto the memory by the OS and completely takes over the control of the PCI cards 12 (12-*i* where i=1 to n) from the option ROM 31.

Here, an operation of the step B08 (Exit Boot Service) will be described in detail below.

(1) Step B081: "Stop Bridge/PCI Card Device (Bus Reset, etc.)

After the data necessary for the OS boot is developed from the DISK onto the memory once, the option ROM 31 calls as the Pre-Boot service 32, the "Exit Boot Service" under the Pre-Boot environment, and stops use of the bridges 111 (111-*i* where i=1 to n) which have been used under the Pre-Boot environment. It should be noted that the device never operates at this time, but the device is surely stopped in consideration of possibility that a TXN (transmit differential pair) of an IB (Interface Bus) remains.

(2) Step B082: "Re-Initialization of Chipset/Internal Bridge Device"

In the "Exit Boot Service", the option ROM 31 performs routing of the PCI device to any of the bridges 111 (111-*i* where i=1 to n) and the PCI cards 12 (12-*i* where i=1 to n) with the 4-KB granularity of the extended IO space based on the resource management table 21 for the OS environment.

(3) Step B083: "Load OS Driver (—OS Boot)"

The BIOS 2 loads the OS driver 41 after completion of the "Exit Boot Service". At this time, the BIOS 2 completely shifts the control of the PCI cards 12 (12-*i* where i=1 to n) from the option ROM 31 to the OS driver 41. Then, the BIOS 2 stops the option ROM 31. The OS driver 41 initializes the PCI cards 12 (12-*i* where i=1 to n), recognizes new resource (range), and starts use of the PCI cards 12 (12-*i* where i=1 to n).

The present invention can provide a function of the extended IO space to the OS even when the driver on the option ROM does not support the extended IO space. The reason for this is as follows. For example, in the Pre-Boot environment in which the BIOS and the option ROM operate, the extended IO space is not supported, but 1-KB hardware resource assignment is possible. On the contrary, under the OS environment in an OS booting state and an OS operating state, the extended IO space is supported but the 1-KB hardware resource assignment is impossible. Under to the condition described above, in the present invention, the hardware resource assignment is switched in accordance with each of types of environment immediately before the OS boot.

As described above, in the present invention, the hardware resource assignment, which is originally carried out only once in the POST, is performed twice (once in the Pre-Boot environment where the BIOS and the driver on the option ROM operate, and once in the OS environment in the OS booting state and the OS operating state), thereby making it possible to use the function of the extended IO space which is not supported in a standard BIOS.

The present invention provides a solution for the two opposite types of environment, in one of which the OS can support the extended IO space but cannot perform the assignment of the 1-KB granularity to the bridge devices, and in another of which the BIOS cannot support the extended IO space in the Pre-Boot environment but can perform the assignment of the 1-KB granularity.

As such, the present invention can provide a software program on the BIOS performing the resource assignment to the chipset and the PCI cards in a large-scaled computer system in a case where there are a large number of PCI cards requesting resources.

The embodiments of the present invention have been described above in detail, but the present invention is not limited to the embodiments described above, and any modifications in a scope not departing from spirits of the present invention, if any, are included in the present invention.

What is claimed is:

1. A resource assignment system, comprising:
   a BIOS (basic input/output system) controlling hardware;
   a chipset provided as a component of said hardware and incorporating a bridge device; and
   a PCI (peripheral components interconnect) device connected to said bridge device,
   wherein said BIOS includes:
   a means for determining an I/O (input/output) space range to be assigned to an upper bridge device associated with a PCI device which requests an I/O space when said hardware is started;
   a means for generating, based on contents determined by said means for determining said I/O space range, a first table related to assignment with a first granularity using Legacy-I/O space for a Pre-Boot environment and a second table related to assignment with a second granularity using an extended I/O space for an OS (operating system) environment;
   a means for performing initialization of said chipset and said bridge device based on said first table in accordance with the assignment with said first granularity;
   a means for starting a process under the Pre-Boot environment;
   a means for starting a boot of an OS under the Pre-Boot environment;
   a means for performing initialization of said chipset and said bridge device based on said second table in accordance with the assignment with said second granularity, upon switching from the Pre-Boot environment to the OS environment;
   a means for terminating the process under the Pre-Boot environment; and
   a means for starting a process under the OS environment.

2. The resource assignment system according to claim 1, wherein said BIOS further includes:
   a means for, when the process under the Pre-Boot environment is started, starting driver on an OptionROM mounted on said PCI device to control said PCI device;
   a means for booting an OS driver upon starting the boot of the OS and shifting control of said PCI device from the driver on said OptionROM to said OS driver; and
   a means for stopping the device on said OptionROM after the shifting.

3. The resource assignment system according to claim 2, wherein the driver on said OptionROM includes:
   a means for developing data necessary for the boot of the OS from a storage to a memory;
   a means for calling a service of the Pre-Boot environment and stopping use of the bridge device having been used under the Pre-Boot environment;
   a means for performing routing with said second granularity for said bridge device and said PCI device in said service based on said second table.

4. A computer in which the resource assignment system according to claim 1 is implemented.

5. A resource assignment method to be implemented on a computer, comprising:
   by a BIOS (basic input/output system) controlling hardware, controlling a chipset provided as a component of said hardware and incorporating a bridge device and a PCI (peripheral components interconnect) device connected to said bridge device;
   determining an I/O (input/output) space range to be assigned to said bridge device connected to said PCI device in response to a request for an I/O space by said PCI device, when said hardware platform is started;
   generating, based on contents determined by said determining said I/O space range, a first table related to assignment with a first granularity using Legacy-I/O space for a Pre-Boot environment and a second table related to assignment with a second granularity using an extended I/O space for an OS (operating system) environment;
   performing initialization of said chipset and said bridge device based on said first table in accordance with the assignment with said first granularity;
   starting a process under the Pre-Boot environment;
   starting a boot of an OS under the Pre-Boot environment;
   performing initialization of said chipset and said bridge device based on said second table in accordance with the assignment with said second granularity, upon switching from the Pre-Boot environment to the OS environment;
   terminating the process under the Pre-Boot environment; and
   starting a process under the OS environment.

6. The resource assignment method according to claim 5, further comprising:
   by said BIOS, starting driver on an OptionROM mounted on said PCI device to control said PCI device when the process under the Pre-Boot environment is started;
   booting an OS driver upon stating the boot of the OS and shifting control of said PCI device from the driver on said OptionROM to said OS driver; and
   stopping the device on said OptionROM after the shifting.

7. The resource assignment method according to claim 6, further comprising:
   by the driver on said OptionROM, developing data necessary for the boot of the OS from a storage to a memory;
   calling a service of the Pre-Boot environment and stopping use of the bridge device having been used under the Pre-Boot environment; and
   performing routing with said second granularity for said bridge device and said PCI device in said service based on said second table.

8. A medium storing a computer program for causing a computer to perform the resource assignment method according to claim 5.

* * * * *